US008929855B2

(12) United States Patent
Winterbottom et al.

(10) Patent No.: US 8,929,855 B2
(45) Date of Patent: Jan. 6, 2015

(54) ENABLING LOCATION DETERMINATION OF USER DEVICE ORIGINATING EMERGENCY SERVICE CALL (71) Applicant: Maple Acquisition LLC, Annapolis, MD (US)

(72) Inventors: Anthony James Winterbottom, Gwynneville (AU); Martin Christopher Dawson, Wollongong (AU)

(73) Assignee: Maple Acquisition LLC, Annapolis, MD (US)

( * ) Notice: Subject to any disclaimer, the term of this patent is extended or adjusted under 35 U.S.C. 154(b) by 0 days.

(21) Appl. No.: 13/690,136

(22) Filed: Nov. 30, 2012

(65) Prior Publication Data

US 2013/0143516 A1 Jun. 6, 2013

Related U.S. Application Data (60) Provisional application No. 61/566,024, filed on Dec. 2, 2011.

(51) Int. Cl.
*H04M 11/04* (2006.01)
*H04W 4/22* (2009.01)

(52) U.S. Cl.
CPC ...................................... *H04W 4/22* (2013.01)
USPC .................. 455/404.2; 455/404.1; 379/45

(58) Field of Classification Search
USPC ........ 455/404.1–404.2; 370/352, 216; 379/45
See application file for complete search history.

(56) References Cited

U.S. PATENT DOCUMENTS

| 2003/0086539 | A1* | 5/2003 | McCalmont et al. | 379/45 |
|---|---|---|---|---|
| 2005/0181805 | A1* | 8/2005 | Gallagher | 455/456.1 |
| 2005/0213716 | A1* | 9/2005 | Zhu et al. | 379/45 |
| 2005/0238142 | A1* | 10/2005 | Winegarden | 379/45 |
| 2006/0072710 | A1* | 4/2006 | Breen et al. | 379/45 |
| 2006/0193446 | A1* | 8/2006 | Colunga | 379/45 |
| 2006/0268902 | A1* | 11/2006 | Bonner | 370/401 |
| 2007/0060097 | A1* | 3/2007 | Edge et al. | 455/404.1 |
| 2007/0140216 | A1* | 6/2007 | Edelmann et al. | 370/352 |
| 2007/0201433 | A1* | 8/2007 | Croak et al. | 370/352 |
| 2007/0242660 | A1* | 10/2007 | Xu | 370/352 |
| 2008/0160953 | A1* | 7/2008 | Mia et al. | 455/404.2 |
| 2008/0273670 | A1* | 11/2008 | Dickinson | 379/45 |
| 2009/0077077 | A1* | 3/2009 | Geldenbott et al. | 707/6 |
| 2009/0147926 | A1* | 6/2009 | Fahrenthold et al. | 379/1.01 |
| 2010/0020942 | A1* | 1/2010 | Olshansky et al. | 379/45 |
| 2011/0065416 | A1* | 3/2011 | Burt et al. | 455/404.2 |
| 2011/0111728 | A1* | 5/2011 | Ferguson et al. | 455/404.2 |

(Continued)

Primary Examiner — Nathan Taylor
(74) Attorney, Agent, or Firm — Tarolli, Sunheim, Covell & Tummino LLP (57) ABSTRACT A method is provided for processing emergency service calls from a user device to a PSAP, the user device having an associated line number and being configured to originate calls from fixed and mobile access networks. The method includes determining whether a call from the user device originates from a home location in a fixed access network. When the call is determined to have originated from the home location in the fixed access network, the call is routed to the PSAP, where a location of the user device is determined based on the Automatic Number Identification (ANI) included in signaling associated with the call. When the call is determined not to have originated from the home location in the fixed access network, adding pseudo-ANI to signaling associated with the call and routing the call to the PSAP, where the location of the user device is determined based on the pANI.

10 Claims, 3 Drawing Sheets

(56) References Cited

U.S. PATENT DOCUMENTS

| | | | |
|---|---|---|---|
| 2011/0228911 A1* | 9/2011 | Snapp et al. | 379/45 |
| 2011/0263219 A1* | 10/2011 | Hasenfang et al. | 455/404.2 |
| 2014/0036658 A1* | 2/2014 | Bonner et al. | 370/216 |

* cited by examiner

ENABLING LOCATION DETERMINATION OF USER DEVICE ORIGINATING EMERGENCY SERVICE CALL

PRIORITY STATEMENT

Priority is claimed from provisional patent application No. 61/566,024, filed Dec. 2, 2011, in the United States Patent and Trademark Office, the disclosure of which is hereby incorporated by reference in its entirety.

BACKGROUND AND SUMMARY

Generally, emergency service calls (e.g., 911 calls) may originate over a wireline or fixed access network (e.g., including landlines) or over a wireless or mobile access network (e.g., including wireless links). For all such emergency service calls, location information regarding the location of the calling user device is determined to assist the emergency service providers. In North America, systems for determining location information are called Automatic Location Identification (ALI) systems.

The location information provided to the emergency service providers for wireline calls is usually contained in a database, which links the line number of the calling user device to subscriber information of the user, which includes the location information. The line number of the user device may be provided (e.g., via signaling) by Automatic Number Identification (ANI). The location information is static and typically includes a street address ("civic address location") that is permanently associated with the line number. Limitations of conventional ALI systems limit the emergency service providers to use of the civic address location in this scenario.

In contrast, the location information provided to the emergency service providers for non-wireline or wireless calls (e.g., mobile calls) must be determined dynamically based on the location of the calling user device at the time the call is made. For example, calls to emergency service providers from mobile devices using a mobile service provide a routing and query key called pseudo-ANI (pANI), which identifies the originating network operator and provides a coarse indicator for the geographical area allowing routing decisions to be made. In cellular networks, for example, the pANI is used by ALI systems to identify and query a mobile location center (MLC) in the operator's cellular network in order to obtain a general location of the mobile device. This location is usually sufficiently accurate for purposes of dispatching emergency responders. The location information is provided dynamically and typically includes an area defined by latitude and longitude ("geodetic location"). Limitations of conventional ALI systems limit the emergency service providers to use of the geodetic location in this scenario.

Internet calling applications, such as Voice over IP (VoIP), enable a user device to operate according to either a fixed access network service or a mobile access network service, using a common line number for either. Internet calling applications thus create a problem for ALI systems, which need to know when to use static location information associated with access to a fixed access network and when to use dynamic location information associated with access to a mobile access network.

According to a representative embodiment, a method is provided for processing emergency service calls from a user device to a PSAP, the user device having an associated line number and being configured to originate calls from a fixed access network and a mobile access network. The method includes determining whether a call from the user device originates from a home location in a fixed access network. When the call is determined to have originated from the home location in the fixed access network, the call is routed to the PSAP, where a location of the user device is determined based on the Automatic Number Identification (ANI) included in signaling associated with the call. When the call is determined not to have originated from the home location in the fixed access network, adding pseudo-ANI to signaling associated with the call and routing the call to the PSAP, where the location of the user device is determined based on the pANI.

According to another representative embodiment, a system for processing calls for emergency services from a user device having an associated line number includes a public safety answering point (PSAP) switch and an Automatic Location Identification (ALI) server. The PSAP is configured to receive a call for emergency services from a switch in communication with a fixed access network and a mobile access network. The call includes Automatic Number Identification (ANI), and no pseudo-ANI (pANI), when the call originates from the user device at a home location in the fixed access network, and the call includes pANI when the call originates from the user device at a remote location in the fixed access network or at a location in a mobile access network. The ALI server is connected to the PSAP switch and configured to determine a location corresponding to the user device based on the ANI when the call originates from the user device at the home location in the fixed access network, and based on the pANI when the call originates from the user device at the remote location in the fixed access network or at the location in the mobile access network.

According to another representative embodiment, a system for processing calls for emergency services from a user device having an associated line number includes a network switch and first and second location servers. The network switch is configured to receive emergency service calls from a user device to a PSAP originating in a fixed access network and a mobile access network, to include ANI and no pANI in call signaling for the emergency service calls that originate from the user device at a home location in the fixed access network, to include pANI in the call signaling for the emergency service calls that originate from the user device at a remote location in the fixed access network or at a location in a mobile access network, and to route the emergency service calls to the PSAP. The first location server is in the fixed access network, and is configured to determine a location of the user device in the fixed access network in response to a query from an ALI server in the PSAP for emergency service calls from the user device originating at a remote location in the fixed access network, and to provide the determined location to the ALI server. The second location server is in the mobile access network, and is configured to determine a location of the user device in the mobile access network in response to a query from the ALI server for emergency service calls from the user device originating in the mobile access network, and to provide the determined location to the ALI server. The location corresponding to the user device is determined based on the ANI when the call originates from the user device at the home location in the fixed access network.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimen

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Emergency service calls, such as 911 calls, are routed to a public safety answering point (PSAP), and may originate from wireline user devices using fixed services via a fixed access network or wireless user devices using mobile services via a mobile access network. Generally, an emergency service call from a wireline user device provides the line number (e.g., via ANI) with the emergency service call, as well as the dialed emergency service number to the PSAP. An emergency service call from a wireless user device, such as a cellular phone, generally delivers one and sometimes two numbers (e.g., pANI and ANI to provide the actual call-back number for the user), as a well as the dialed emergency service number to the PSAP.

Various representative embodiments are directed to providing location information to support emergency services for user devices and telephony services that share a common line number across different access technologies. For example, when a user device is used to initiate an emergency service call from its home location in a fixed access network, then traditional ALI civic address location is provided to the emergency service provider. When the user device is used to initiate an emergency service call from a different location in either a fixed access network or a mobile access network, then a geodetic location or a civic location is provided to the emergency service provider, depending on the nature of the access network (e.g., fixed access or mobile access). More particularly, various embodiments are directed to environments in which calls are made through fixed access networks or mobile access networks, e.g., using the same line number. For calls originating from a home location in a fixed access network, the location information is a static civic address location, which is permanently stored in association with the line number. For calls originating from a remote location in a fixed access network or from any location in a mobile access network, the location information is dynamically determined, and may be a geodetic location or a civic address location, which is reported in this form.

ALI systems designed for a conventional environment do not naturally support a location associated with a specific line number being reported as a civic address in one circumstance and as a geodetic location in a different circumstance or even a different civic address in yet another circumstance. The various embodiments provide a mechanism by which this differentiated location reporting can be achieved in conjunction with the conventional systems. Thus, the various embodiments include modifying the manner in the originating network operator presents the emergency service calls to the PSAP depending on the nature of the access service from which the emergency service call originates. Generally, upon detecting that the emergency service call originates from the home location in a fixed access network that is associated with the user device, the network operator delivers the emergency service call to the PSAP with a single line number via ANI. The presence of the single number (or the ANI) indicates to the ALI system that it should use the statically configured civic address location corresponding to the user device as the location information associated with the emergency service call. Upon detecting that the emergency service call originates from a mobile location in a fixed access network that is not the home location of the user device, or originates from a location in a mobile access network, the network operator delivers the emergency service call to the PSAP with pANI, either in place of the ANI or in addition to the ANI. The presence of the pANI indicates to the ALI system that the emergency service call should be treated as a roaming call (mobile or fixed from a location other than the home location), and that it should use the pANI to request dynamic location information from the network operator.

Figure 1:
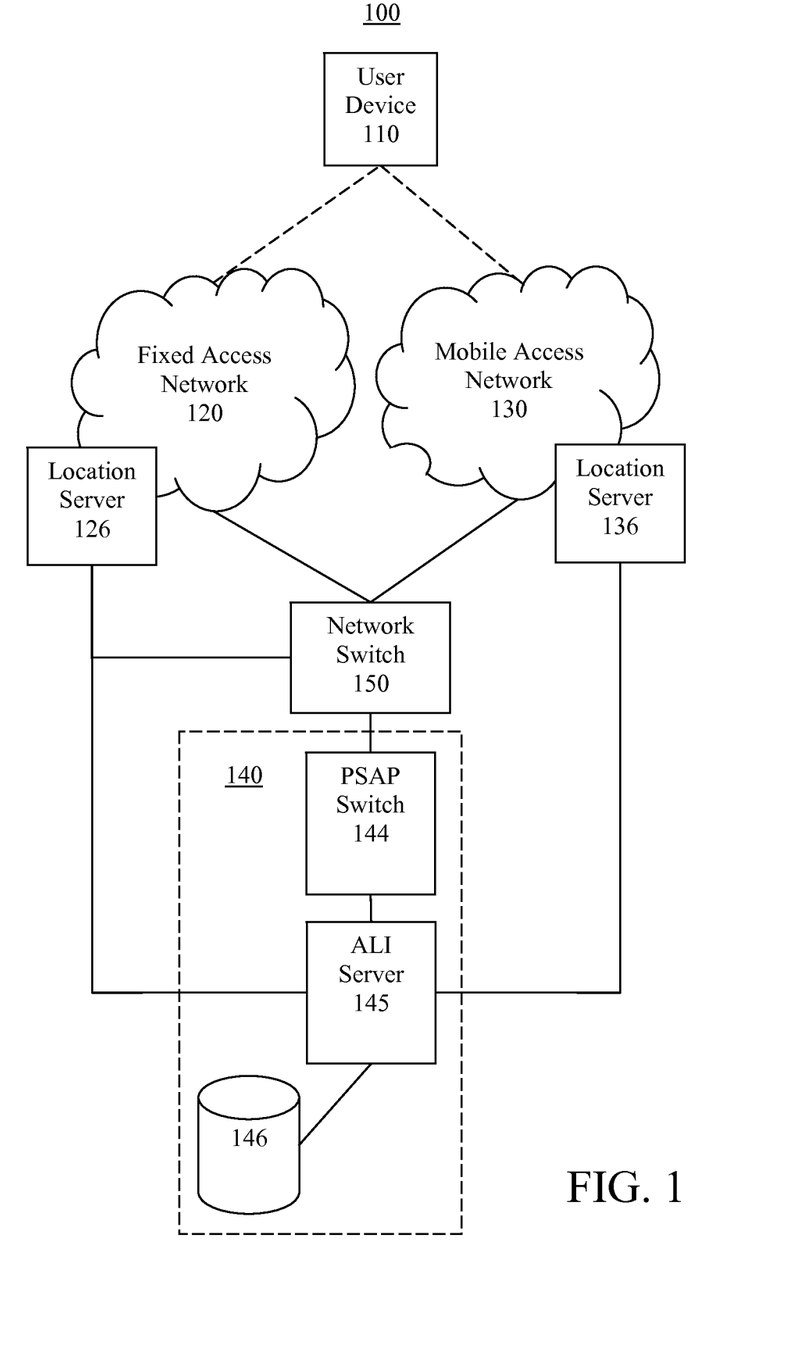
- FIG 1 is a simplified block diagram illustrating a system for routing and providing location information with respect to a user device for emergency service calls originating in fixed access or mobile access networks, according to representative embodiments.

FIG 1 is a simplified block diagram illustrating a system 100 for routing and providing location information with respect to a user device for emergency service calls originating in fixed access or mobile access networks, according to representative embodiments.

Referring to FIG 1, representative user device 110 is any type of portable user device, such as a cellular telephone, an Internet telephone, a smart phone, a personal digital assistant (PDA), a portable computer, and the like. The user device is capable of voice (and data) communications over different types of communications networks, such as representative fixed access network 120 and mobile access network 130, using the same line number, indicated by the dashed lines. The user device 110 enables a user to place emergency service calls, such as 911 calls, which are to be routed to public safety answering point (PSAP) 140.

The fixed access network 120 may be a circuit switching network, such as the public switched telephone network (PSTN), or a packet switching network, such as the public Internet, for example, and is configured to enable wireline communications. In the depicted embodiment, the fixed access network 120 communicates with representative network switch 150, to which emergency service calls originating in the fixed access network 120 are routed. The network switch 150 may be a signaling switching point (SSP) in a circuit switching network or a router in a packet switching network, for example. The network switch 150 may alternatively include a Mobile Switching Center (MSC) in a circuit switching network or a serving General Packet Radio Service (GPRS) support node (SGSN) or a Mobility Management Entity (MME) in a packet switching network, for example, for servicing the mobile access network 130, as discussed below. The network switch 150 is in communication with a previously populated location server 126. The location server 126 includes, in part, information relating to the subscribers of the fixed access network services, including identification of a line number and a home location corresponding to each user device 110. Therefore, the network switch 150 is able to determine whether an emergency service call from the user device 110 over the fixed access network 120 is originating from the home location. The fixed access network 120 may further include additional components, such as access points or access locations (by which the user device 110 accesses the fixed access network 120), routers and/or switches, for example, as would be apparent to one of ordinary skill in the art. The access points may be wired, such as cable modems, or may be wireless, such as IEEE 802.11 (WiFi) and IEEE 802.16 (WiMax) hot spots, for example.

The mobile access network 130 may be a mobile telephone network, such as a Universal Mobile Telecommunications System (UMTS) network, a Global System for Mobile communications (GSM) network, a Long Term Evolution (LTE) network, a code division multiple access (CDMA) network, a General Packet Radio Service (GPRS) network, for example, and is configured to enable wireless communications. The mobile access network 130 also communicates with the representative network switch 150, to which emergency service calls originating in the mobile access network 130 are routed. For example, the system 100 may have a 3GPP IP Multimedia Subsystem (IMS) configuration, in which the fixed access network 120 and the mobile access network 130 share the network switch 150. Indeed, in various embodiments, multiple different types of mobile and fixed access networks can be serviced by the same switch. Of course, in alternative embodiments, the fixed access network 120 and the mobile access network 130 may access separate switches, respectively, without departing from the scope of the present teachings. The mobile access network 130 includes a location server 136, which may be a mobile location center (MLC), for example, which determines locations of the user device 110 using any of various geodetic location determination techniques, as discussed below. The mobile access network 130 may further include base stations or node-Bs, base station controllers (BSCs) or radio network controllers (RNCs), and serving mobile location centers (SMLCs), evolved SMLCs (E-SIVILCs) or stand-alone SMLCs (SASs), for example, as would be apparent to one of ordinary skill in the art. Generally, the switch 150 needs to obtain routing information to the correct PSAP switch (e.g., PSAP switch 144) based on the location of the calling user device 110. The switch 150 may obtain this information using internal tables and configuration or through the assistance of an external location and routing node, such a location retrieval function (LRF).

The user device 110 may be a cellular telephone and/or a VoIP telephone, for example, capable of communicating via both the fixed access network 120 (from multiple access locations) and the mobile access network 130, according to the wireline and wireless services to which the user subscribes, respectively. Notably, in this illustrative scenario, the user device 110 has one access location in the fixed access network 120 that corresponds to the home location of the user. For example, the user device 110 may have a home location corresponding to a residential WiFi network enabling a wireline broadband service over the fixed access network 120. Other access locations for accessing the fixed access network 120, such as public WiFi hotspots, correspond to remote locations for the user. Meanwhile, the user device 110 may also access the mobile access network 130 via base stations and/or Node Bs of the mobile access network 130. Therefore, the user device 110 may originate calls from home or remote locations in the fixed access network 120, as well as mobile locations in the mobile access network 130. In various embodiments, the user device 110 has the same line number, regardless of whether it is accessing the fixed access network 120 or the mobile access network 130.

The system 100 further includes the PSAP 140, which may be implemented as a network including a PSAP switch 144, an ALI server 145 and an ALI database 146. The ALI server 145 and an ALI database 146 may be collectively referred to as an ALI system. Emergency service calls (e.g., placed by the user device 110) are routed to the PSAP 140 via the network switch 150 for emergency service calls originating in the fixed access network 120 and the mobile access network 130. In the depicted illustrative configuration, the emergency service calls are received by PSAP switch 144, which may include a switch, a router, a server, or various combinations thereof, without departing from the scope of the present teachings. In an embodiment, the network switch 150 and the PSAP switch 144 may be configured as a single switch. The PSAP switch 144 queries the ALI server 145, which is configured to determine and provide the location of the calling device (e.g., the user device 110). The ALI database 146 may store line numbers and civic address locations corresponding to the home locations of subscriber user devices. The ALI database 146 may therefore be used to determine the location of the user device 110 when the emergency service call originates in the fixed access network 120 from the home location of the user device 110, as discussed below.

Figure 2:
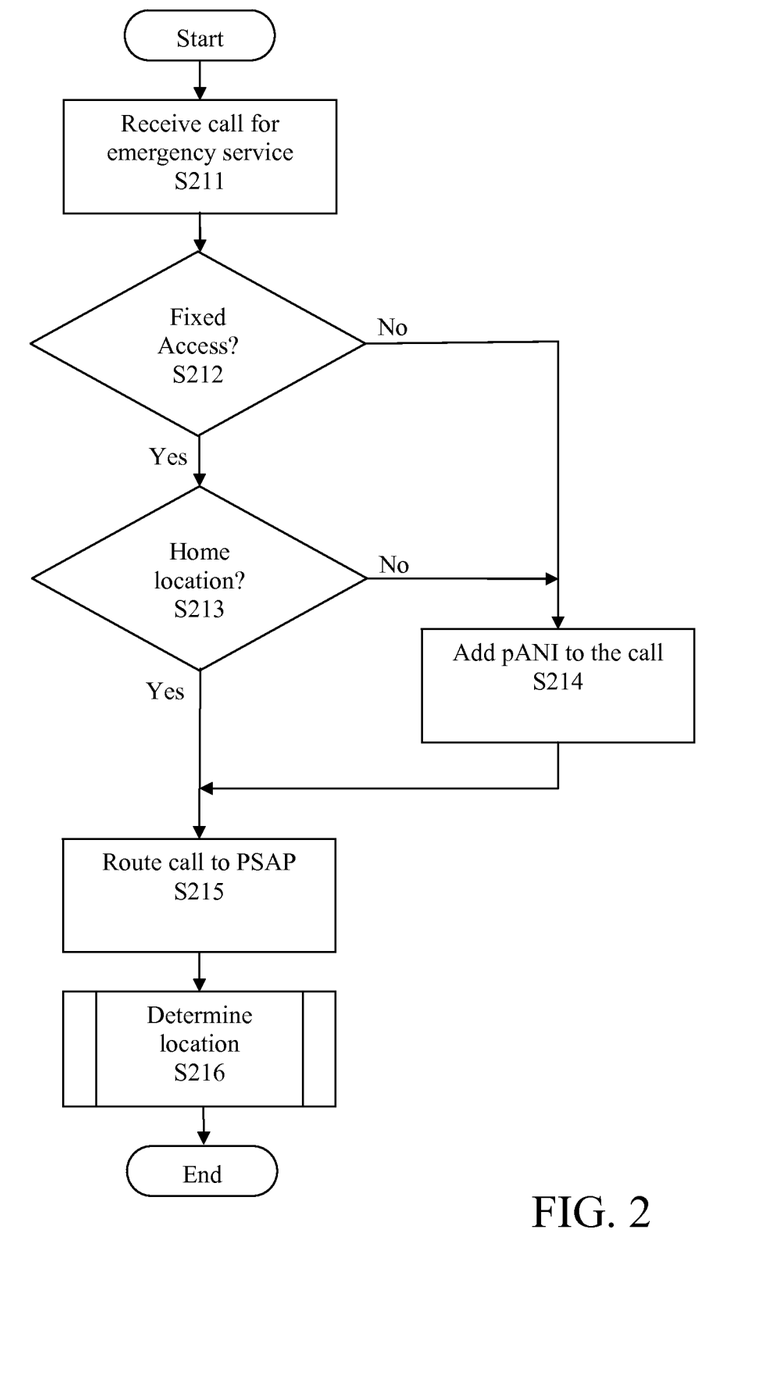
FIG 2 is a flow diagram illustrating a method of processing emergency service calls from a user device, where the user device has an associated line number and is configured to originate calls from both fixed and mobile access networks, according to a representative embodiment.

FIG 2 is a flow diagram illustrating a method of processing emergency service calls from a user device to a PSAP, where the user device has an associated line number and is configured to originate calls from both fixed and mobile access networks, according to a representative embodiment. The various operations depicted in FIG 2 may be included in logic executable by a computer processor, as discussed below. The processing may be performed, for example, by the network switch 150, in a separate server, or some combination thereof (e.g., by distributed processing).

Referring to FIGS. 1 and 2, an emergency service call is received at the network switch 150 from the user device 110 in operation S211 through a network in which the emergency service call originates (originating network), such as the fixed access network 120 or the mobile access network 130. The network switch 150 may be configured and maintained accordingly by respective originating network operators, which may or may not be the same entity.

In operation 212, it is determined whether the emergency service call originates from the fixed access network 120. This determination may be made, for example, by looking at the asserted network type, which may be included in the call signaling. However, the determination may be based on any other network identifier, such as the IP address of the user device 110, without departing from the scope of the present teachings.

When it is determined that the emergency service call originates from the fixed access network 120 (operation S212: Yes), the originating network operator determines whether the user device 110 is accessing the fixed access network 120 from its home location in operation S213. This determination may be made by accessing the location server 126, for example, which associates line numbers with corresponding home locations of user devices, including the user device 110. In this case, the dialed emergency service number (e.g., 911), the line number of the user device 110 provided via ANI, and the call origination location are included in signaling provided by the fixed access network 120 to the network switch 150, as would be apparent to one of ordinary skill in the art. The network switch 150 is thus able to query the location server 126 for the home location of the user device 110, compare the retrieved home location with the call origination location, and determine whether the user device 110 is accessing the fixed access network 120 from its home location.

When it is determined that the access location for the fixed access network 120 corresponds to the home location (operation S213: Yes), the network switch 150 signals only the ANI with the emergency service call in operation S214 and routes the emergency service call to the appropriate PSAP (e.g., PSAP 140 via the PSAP server 144) in operation S215, selecting the PSAP using known emergency service routing techniques. As mentioned above, the ANI is the calling line number of the user device 110, and the sole presence of the ANI indicates to the PSAP 140 that the user device 110 is at its home location. In operation S216, the PSAP 140 determines the present location of the user device 110. In this case, the present location may be a civic address location previously associated with the line number and/or the home location and stored in the ALI database 146, accessible by the ALI server 145. Location determination operations of the PSAP 140 are discussed below with reference to FIG. 3.

Referring again to operation S212, when it is determined that the emergency service call does not originate from the fixed access network 120 (operation S212: No), indicating that it originates from the mobile access network 130, for example, the network switch 150 adds pANI to the emergency service call, along with or in place of the ANI, in operation 5214 and routes the emergency service call to the PSAP 140 in operation 5215. Likewise, referring again to operation 5213, when it is determined that the emergency service call originates from the fixed access network 120, but that the access location of the fixed access network 120 is not associated with the home location of the user device 110 (operation 5213: No), the network switch 150 adds pANI to the emergency service call, along with or in place of the ANI, in operation 5214 and routes the emergency service call to the PSAP 140 in operation 5215. Again, the PSAP 140 is selected using known emergency service routing techniques. In operation 5216, the PSAP 140 determines the present location of the user device 110. In this case, the present location may be a geodetic location determined at least in part using the pANI or may be a civic location. Location determination operations of the PSAP 140 are discussed below with reference to FIG 3.

As mentioned above, the pANI is a routing and query key, which may identify the originating access network and/or the originating network operator and may provide a coarse indicator for the geographical area of the calling device 110. In various embodiments, the pANI may identify a non-dialable number associated with the present location of the user device 115. For example, when the user device 115 originates the emergency service call from the mobile access network 130, the pANI may be a number associated with the servicing base station or Node B with which the user device 110 is in communication. Or, when the user device 110 originates the emergency service call from the fixed access network 120, the pANI may be a number associated with the cable modem, WiFi hotspot, or other Internet access point, for example, with which the user device is in communication. In an embodiment, it may be sufficient for the pANI to identify the operator network from which the emergency service call originated. In this case, the pANI is used to route a location request to the originating network operator, and the originating network operator uses the line number provided via ANI to determine the location of the user device 110, which is provided to the PSAP 140, as discussed below. Thus, the pANI may be used as an identifier for the emergency service call itself, or as means of identifying the network operator and/or the fixed access network 120 or mobile access network 130 from which the emergency service call originated.

Notably, FIG 2 provides one illustration of routing an emergency service call from the user device 110 to the PSAP 140 for location determination. It is understood that the operations may vary without departing from the scope of the present teachings. For example, in operation 5212, it may be specifically determined whether the emergency service call originates in the mobile access network 130 instead of or in addition to determining whether the emergency service call originates in the fixed access network 120. For example, in some network environments, such as an IMS core network, the network operator controls all the access networks from which the user device 110 may originate an emergency service call, as mentioned above, so the type of access network (fixed or mobile) is included in the call signaling (e.g., along with the line number). When the network operator accepts calls from arbitrary access networks (referred to as Over The Top (OTT) providers), the nature of the access network is less determinant. However, the type of access may be signaled to the network operator, along with the location of the calling user device 110, as supported by communication standards. An example of such signaling is the "Method" element in the Presence Information Data Format 13 Location Object (PIDF-LO), defined in RFC 4119, "A Presence-Based GEOPRIV Location Object Format" (December 2005).

Figure 3:
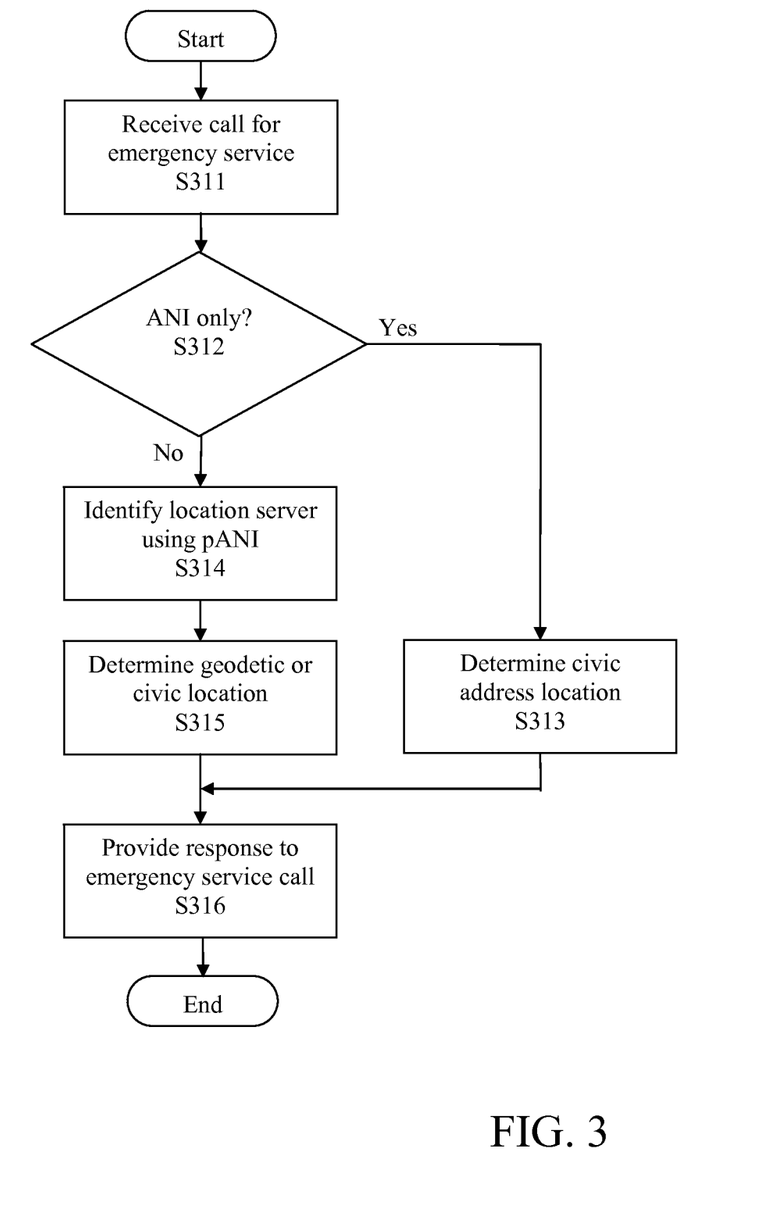
FIG 3 is a flow diagram illustrating a method of determining location information for the user device originating the emergency service calls, according to a representative embodiment.

FIG 3 is a flow diagram illustrating a method of determining location information for the user device originating the emergency service calls, according to a representative embodiment. The various operations depicted in FIG 3 may be included in logic executable by a computer processor, for example, as discussed below. The processing may be performed by one or both of the PSAP switch 144 and the ALI server 145, in a separate server, or some combination thereof (e.g., by distributed processing).

Referring to FIGS. 1 and 3, an emergency service call, routed from the fixed access network 120 or the mobile access network 130, is received by the PSAP 140 in operation 5311. In operation 5312, the PSAP switch 144 determines whether the signaling associated with the emergency service call includes ANI and/or pANI. When it is determined that the signaling includes only the ANI (operation 5312: Yes), the PSAP switch 144 determines a civic address location corresponding to the ANI in operation S313, where the civic address location is the home location of the user device 110. For example, the PSAP switch 144 may provide the ANI to the ALI server 145, which retrieves the civic address location from the ALI database 146 in response to a query. As mentioned above, the ALI database 146 may be previously populated with line numbers and civic address locations corresponding to the home locations of various user devices, including the user device 110. The PSAP 140 then provides a response to the emergency service call in operation S316 using the civic address location provided by the ALI server 145 as the location information, for example, to aid in further call routing and/or providing an emergency response.

Returning to operation S312, when it is determined that the signaling does not include only ANI, meaning that it includes pANI in place of or addition to ANI (operation S312: No), the PSAP switch 144 queries the ALI server 145 with the pANI (and the ANI if available), and the ALI server 145 identifies the location server associated with the specific pANI using the value of the pANI in operation S314, and requests location information from the identified location server. In the depicted example, the identified location server would be the location server 126 for calls originating in the fixed access network 120 and the location server 136 for calls originating in the mobile access network 130, The location server 126, 136 determines a geodetic location and/or a civic address location of the user device 110, which is provided to the ALI server 145 in operation S315. The PSAP 140 then provides a response to the emergency service call in operation S316 using the geodetic location or the civic address location provided to the ALI server 145 as the location information, for example, to aid in further call routing and/or providing an emergency response.

Generally, the PSAP switch 144 may use the pANI as the primary key to query the ALI server 145. The ALI server 145 may have a steering record for pANI entries, enabling the ALI server 145 to determine with which location server 126, 136 to communicate. The ALI server 145 may identify and query the appropriate location server 126, 136 using the call-back number, e.g., provided by the ANI. The location server 126, 136 may use the ANI to determine where the call originated, so that it can return the correct location information to the ALI server 145. The ALI server 145 then passes this location back to the PSAP switch 144. In an embodiment implemented using an IMS network, the ALI server 145 communicates with a single node in the fixed access network 120 or the mobile access network 130 called the location retrieval function (LRF) (not shown). Underneath the LRF, there may be multiple location servers, such as the location servers 126, 136, each of which may serve a different type of access network.

In an embodiment, when the originating network is the mobile access network 130, the location server 136 may provide the geodetic location (e.g., longitude and latitude) corresponding to the user device 110. For example, the PSAP switch 144 may provide the pANI to the ALI server 145, which uses the pANI to identify and query the location server 136 of the mobile access network 130 for location information regarding the user device 110. For example, the pANI may include an identifier corresponding to the location server 136 specifically, or to the network operator of the mobile access network 130 generally, in which case the ALI server 145 may look up the location server 136 in a previously populated database. The location server 136 may determine the geodetic location of the user device 110 using any known location determination technique. For example, the MLC 136 may determine dynamically in real time the geodetic location of the user device 110 itself, using a satellite based positioning system, such as Global Positioning System (GPS), and/or a terrestrial based positioning system, such as uplink-time difference of arrival (U-TDOA), angle of arrival (AoA), and power of arrival (POA) based systems. Any positioning determination technique may be incorporated without departing from the scope of the present teachings. Alternatively, location server 136 may identify a previously determined geodetic location and/or the civic address location corresponding to the mobile access network 130 and/or a particular component of the mobile access network 130, such as the location of the base station or Node B presently servicing the user device 110. The previously determined geodetic and/or civic address locations may be stored in a database, for example.

When the originating network is the fixed access network 120, the location server 126 may provide a geodetic location and/or a civic location corresponding to the user device 110. For example, the PSAP switch 144 may provide the pANI to the ALI server 145, which uses the pANI to identify and query the location server 126 of the fixed access network 120 for location information regarding the user device 110. For example, the pANI may include an identifier corresponding to the location server 126 specifically, or to the network operator of the fixed access network 120 generally, in which case the ALI server 145 may look up the location server 126 in a previously populated database. The location server 126 may determine the geodetic location corresponding to the user device 110 using any known location determination technique. For example, the location server 126 may look up the geodetic location and/or the civic address location of the remote access location used by the user device 110 to originate the emergency service call in the fixed access network 120. Alternatively, in an embodiment, the ALI server 145 may access another database (e.g., the ALI database 146) previously populated with geodetic and/or civic address locations corresponding to associated access locations of the fixed access network 120, in which case the location server 126 may simply provide the identity of the remote access location utilized by the user device 110, enabling the ALI server 145 to query the database of geodetic and/or civic address locations. Any location determination technique may be incorporated without departing from the scope of the present teachings.

In operation S316, the PSAP 140 provides a response to the emergency call using the civic location or the geodetic location associated with the user device 110 in one of operations S313 and S315. For example, the PSAP 140 may identify an emergency services facility, such as a police station, a fire station or a hospital, physically closest to the civic location or the geodetic location associated with the user device 110. The PSAP 140 may then route the emergency service call to the identified emergency services facility, or dispatch emergency service personal from the appropriate facility.

Notably, in a conventional system, the communication between the location server 126 and the ALI server 145 would be one direction, that is, from the location server 126 to the ALI server 145. This is because the static data is pushed to the ALI server 145 ahead of time. In other words, in a conventional system, the ALI server 145 does not pull for static wireline services, but rather the data is pushed from the service provider (e.g., using the location server 126) when the service is first provisioned.

All or part of the various process operations described with reference to FIGS. 2 and 3 may be performed by one or more processing devices, such as switch 150, location servers 126 and 136, PSAP switch 144, and/or ALI server 145, for example. The service may be implemented using internal logic or software, stored on a computer readable medium, and executable by one or more computer processors, application specific integrated circuits (ASICs), field-programmable gate arrays (FPGAs) or combinations thereof. This enables the emergency service calls to be delivered in a manner transparent to the traditional emergency calling infrastructure. Examples of a computer readable medium include various types of nonvolatile read only memory (ROM) and volatile random access memory (RAM), such as a disk drive, an electrically programmable read-only memory (EPROM), an electrically erasable and programmable read only memory (EEPROM), a CD, a DVD, a universal serial bus (USB) drive, and the like.

Further, in various embodiments, the operation steps depicted FIGS. 2 and 3 may be incorporated within one or more processing modules of various devices, such as the network switch 150, location servers 126 and 136, PSAP switch 144, and/or ALI server 145, for example. The modules may be implemented as any combination of software, hard-wired logic circuits and/or firmware configured to perform the designated operations. Software modules, in particular, may include source code written in any of a variety of computing languages, such as C++, C# or Java, and are stored on tangible computer readable storage media, as discussed above.

According to various embodiments, a PSAP is able to retrieve location information corresponding to a user device in response to an emergency service call, regardless of whether the call originates from a home location in a fixed wireline network, a remote location in a fixed wireline network, or any location in a mobile wireless network. The PSAP uses ANI and/or pANI included in signaling accompanying the emergency service call when it is routed to the PSAP from switches or routers in one of the fixed wireline network or the mobile wireless network. The PSAP is able to provide a civic address location of the user device in response to the ANI and a geodetic or civic location of the user device in response to the pANI.

While specific embodiments are disclosed herein, many variations are possible, which remain within the concept and scope of the invention. Such variations would become clear after inspection of the specification, drawings and claims herein. The invention therefore is not to be restricted except within the scope of the appended claims.

What is claimed is:

1. A method of processing emergency service calls from a user device to a public safety answering point (PSAP), the user device having an associated line number and being configured to originate calls from a fixed access network and a mobile access network, wherein the mobile access network comprises a cellular telephone network, the method comprising:
   determining whether a call from the user device originates from the fixed access network or from the mobile access network based on an asserted network type included in signaling of the call;
   determining whether a call from the user device originates from a home location in the fixed access network in response to determining that the call originates from the fixed access network;
   routing the call to the PSAP in response to determining that the call has originated from the home location in the fixed access network, wherein a location of the user device is determined based on the Automatic Number Identification (ANI) included in signaling associated with the call; and
   adding pseudo-ANI to signaling associated with the call and routing the call to the PSAP in response to determining that the call has not originated from the fixed access network or in response to determining that the call has not originated from the home location in the fixed access network, wherein the location of the user device is determined based on the pANI added to the call.

2. The method of claim 1, wherein the location of the user device is determined to be a civic address location previously associated with the home location based on the ANI.

3. The method of claim 1, wherein the location of the user device is determined to be a calculated geodetic location or civic location based on the pANI and a nature of the access network.

4. The method of claim 3, wherein the pANI identifies a non-dialable number associated with the present location of the user device.

5. The method of claim 4, wherein the non-dialable number identified by the pANI is associated with one of a base station or a Node B servicing the user device in the mobile access network.

6. The method of claim 4, wherein the non-dialable number identified by the pANI is associated with an Internet access point with which the user device is in communication in the fixed access network.

7. A system for processing calls for emergency services from a user device having an associated line number, the system comprising:
   a network switch configured to:
      receive emergency service calls from a user device to a public safety answering point (PSAP) originating in a fixed access network and a mobile access network:
      determine whether each of the emergency service calls has originated from a home location in the fixed access network based in part on an asserted network type included in signaling of each of the emergency service calls;
      provide identification data that includes an Automatic Number Identification (ANI) in call signaling for a given emergency service call of the emergency service calls in response to determining that the given emergency service call originated from the user device at the home location in the fixed access network;
      provide identification data that includes a pseudo-ANI in the call signaling for another emergency service call of the emergency service calls in response to determining that the other emergency service call originated from the user device at a remote location in the fixed access network; and
      provide identification data that includes a pseudo-ANI in the call signaling for yet another emergency service call of the emergency service calls in response to determining that the yet another emergency service call originated from the user device communicating on a mobile access network, wherein the mobile access network comprises a cellular telephone network;
      rout the emergency service calls to the PSAP;
   a first location server in the fixed access network configured to:
      determine a location of the user device in the fixed access network in response to a query from an Automatic Location Identification (ALI) server in the PSAP for the other emergency service call that originated from user device at the remote location in the fixed network; and
      provide the determined location to the ALI server; and
   a second location server in the mobile access network configured to:
      determine a location of the user device in the mobile access network in response to a query from the ALI server for the yet another emergency service call that originated from the user device communicating on the mobile access network; and
      provide the determined location to the ALI server,
   wherein the location corresponding to the user device is determined based on the ANI for the given emergency service call originating from the user device at the home location in the fixed access network.

8. The system of claim 7, wherein the first location server determines the location of the user device as a civic address location.

9. The system of claim 7, wherein the first location server determines the location of the user device as a geodetic location.

10. The system of claim 7, wherein the second location server determines the location of the user device as a geodetic location.

\* \* \* \* \*